United States Patent
Ahrens et al.

(10) Patent No.: US 6,441,532 B1
(45) Date of Patent: Aug. 27, 2002

(54) SQUIRREL CAGE ROTOR FOR A HIGH-SPEED ELECTRICAL MACHINE WITH DEFINED PRESSING SURFACE DISKS

(75) Inventors: Markus Ahrens, Rütihof; Herbert Prenner, Birmenstorf, both of (CH)

(73) Assignee: ABB (Schweiz) AG, Baden (CH)

( * ) Notice: Subject to any disclaimer, the term of this patent is extended or adjusted under 35 U.S.C. 154(b) by 0 days.

(21) Appl. No.: 09/711,915

(22) Filed: Nov. 15, 2000

(30) Foreign Application Priority Data

Nov. 22, 1999 (DE) .......................... 199 56 042

(51) Int. Cl.$^7$ .................... H02K 1/06; H02K 17/16; H02K 17/22; H02K 17/42; H02K 19/14
(52) U.S. Cl. .................... 310/217; 310/211
(58) Field of Search .......................... 310/211

(56) References Cited

U.S. PATENT DOCUMENTS

| | | | | |
|---|---|---|---|---|
| 2,421,860 A | * | 6/1947 | Winther | 310/210 |
| 2,499,390 A | * | 3/1950 | Joy | 310/211 |
| 2,975,312 A | * | 3/1961 | Ploran | 310/217 |
| 3,780,428 A | * | 12/1973 | Zorev et al. | 29/598 |
| 3,793,546 A | * | 2/1974 | King, Jr. | 310/183 |
| 3,826,940 A | * | 7/1974 | McKean et al. | 310/211 |
| 3,987,325 A | * | 10/1976 | Wilson et al. | 310/197 |
| 4,160,182 A | * | 7/1979 | Mitsui | 310/214 |
| 4,249,098 A | * | 2/1981 | Karlen et al. | 310/183 |
| 4,272,579 A | * | 6/1981 | Mitsui | 29/521 |
| 4,453,101 A | * | 6/1984 | Nelson | 310/211 |
| 4,514,654 A | * | 4/1985 | Muller | 310/114 |
| 4,695,754 A | * | 9/1987 | Popov et al. | 310/156.61 |
| 4,728,842 A | * | 3/1988 | Martin | 29/564.2 |
| 4,900,636 A | * | 2/1990 | Takenouchi et al. | 336/217 |
| 5,075,150 A | * | 12/1991 | Webb et al. | 29/609 |
| 5,142,178 A | * | 8/1992 | Kloster et al. | 310/216 |
| 5,338,996 A | * | 8/1994 | Yamamoto | 310/216 |
| 5,406,243 A | * | 4/1995 | Jenkins et al. | 29/609 |
| 5,422,527 A | * | 6/1995 | Lazzaro | 310/211 |
| 5,512,792 A | * | 4/1996 | Bawin et al. | 310/262 |
| 5,755,023 A | * | 5/1998 | Neuenschwander | 29/596 |
| 5,796,202 A | * | 8/1998 | Herron et al. | 310/217 |
| 6,092,277 A | * | 7/2000 | Beltowski et al. | 29/598 |
| 6,177,750 B1 | * | 1/2001 | Tompkin | 310/261 |

FOREIGN PATENT DOCUMENTS

| | | | |
|---|---|---|---|
| JP | 04-334955 | * | 11/1992 |
| JP | 06-022515 | * | 1/1994 |

OTHER PUBLICATIONS

Guru et al., Electric Machinery & Transformers, 1995, Oxford University Press, 2$^{nd}$ Ed., pp 99–103.*

* cited by examiner

Primary Examiner—Nestor Ramirez
Assistant Examiner—Pedro J. Cuevas
(74) Attorney, Agent, or Firm—Burns, Doane, Swecker & Mathis, L.L.P.

(57) ABSTRACT

A rotor for a high-speed electrical machine is specified, which rotor is composed of a stack of several thick solid disks axially lined up next to one another, the solid disks having a defined pressing surface at their end faces, and tie rods passing through the stack in the axial direction in the region of the pressing surfaces. In this case, the tie rods press the solid disks against one another at the pressing surfaces. Furthermore, in order to save weight and material, a central, rotationally symmetrical recess adjoining the marginal region of each solid disk is provided on at least one end face of the solid disk.

17 Claims, 4 Drawing Sheets

SQUIRREL CAGE ROTOR FOR A HIGH-SPEED ELECTRICAL MACHINE WITH DEFINED PRESSING SURFACE DISKS

This application claims priority under 35 U.S.C. §§119 and/or 365 to Appln. No. 199 56 042.0 filed in Germany on Nov. 22, 1999; the entire content of which is hereby incorporated by reference.

FIELD OF THE INVENTION

The invention relates to the field of rotating electrical machines. It is based on a rotor for a high-speed electrical machine.

BACKGROUND OF THE INVENTION

Electrical high-speed rotating machines, in particular asynchronous machines, normally have a rotor which comprises a laminated core. DE 693 11 530 T2 discloses such a rotor. A short-circuiting ring is attached to each of the two end faces of the laminated core. The short-circuiting rings connect the short-circuiting bars, in which case the short-circuiting bars pass through the laminated core in the circumferential direction. The short-circuiting rings with the short-circuiting bars form a cage winding. Furthermore, according to DE 693 11 530 T2, in each case a shaft stub is centrally attached to the end faces of the rotor, of which shaft stubs at least one serves to transmit the rotary movement of the rotor, for example, to a unit to be driven. Each shaft stub rests on the respective short-circuiting ring. Furthermore, tie rods jointly pass through the laminated core, the short-circuiting rings and the shaft stubs in the circumferential direction. The tie rods serve to hold the laminated core together, these tie rods being supported on the shaft stubs and pressing the short-circuiting rings against the laminated core.

The ends of the shaft stubs are guided in a conventional manner by bearings, and a coupling device is generally provided at least at one end.

A problem with the rotor according to DE 693 11 530 T2 is that a high axial force is required in the tie rods in order to be able to achieve suitable rigidity of the entire rotor and in particular of the laminated core during high-speed operation. There is no defined bearing surface of the individual laminations, since the laminations of the rotor are subject to production tolerances and have waviness, with the result that an asymmetrical rotor assembly may be produced during the stacking of the laminations. This may lead to nonconcentric running of the rotor during operation and to complicated additional balancing measures for achieving uniform concentric running of the rotor.

Furthermore, DE 573512 discloses a turbogenerator rotor of high rigidity, which is composed of welded disks lined up next to one another, the disks being provided with prominences and recessed portions at the end faces.

However, the design of the rotor according to DE 573512 is complicated due to the requisite welding of the disks and is thus expensive to produce. In addition, the disks, in particular the prominences and recessed portions, have to be produced very exactly, so that they engage one inside the other in an accurate manner. This increases the production costs considerably.

SUMMARY OF THE INVENTION

The object of the invention is therefore to specify a rotor for a high-speed electrical machine, which rotor is especially rigid at high speeds and in addition is constructed in a very simple and thus cost-effective and easy-to-maintain manner.

The rotor according to the invention has a stack of several thick solid disks which are lined up next to one another and have a defined pressing surface at their end faces. Furthermore, tie rods pass through the stack in the axial direction in the region of and/or close to the pressing surface, the tie rods pressing the solid disks against one another. As a result, an extremely rigid rotor assembly, which is necessary for high speeds, is obtained in an exceptionally advantageous manner. Furthermore, the rotor has excellent flexural rigidity during thermal loads. In addition, the solid disks can be produced in a very simple and cost-effective manner, for example by turning.

Furthermore, the pressing surfaces are advantageously located essentially in the marginal region and/or close to the marginal region of the end faces of the solid disks and are designed according to the invention essentially as annular surfaces, so that high flexural rigidity with at the same time low axial forces in the tie rods and thus especially smooth concentric running of the rotor are achieved in this region of the solid disks, which, is especially subjected to stress by centrifugal forces at high speeds. In addition, due to these excellent concentric running properties, the shaft bearings of the rotor and of units to be driven which are coupled to shaft ends of the rotor will be subjected to considerably less wear.

BRIEF DESCRIPTION OF THE DRAWINGS

This and further objects, advantages and features of the present invention will become apparent from the description below of a preferred exemplary embodiment of the invention.

The invention is explained in more detail below with reference to an exemplary embodiment in connection with the drawing, in which.

DETAILED DESCRIPTION OF THE PREFERRED EMBODIMENT

Figure 1:
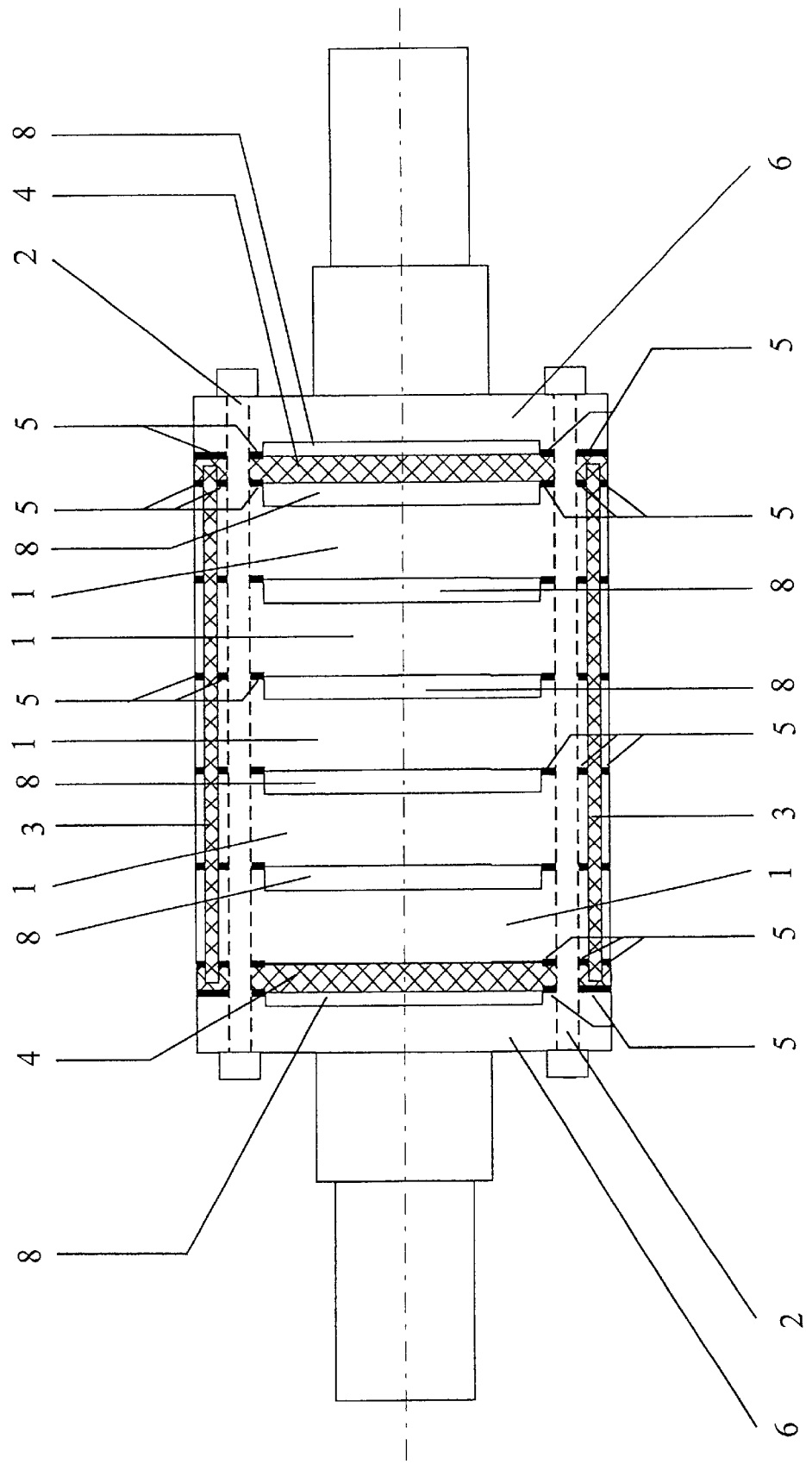
FIG. 1 shows a sectional front view of an embodiment of a rotor for a high-speed electrical machine.

FIG. 1 shows an embodiment according to the invention of a rotor of a high-speed electrical machine. The rotor has a stack of several thick solid disks 1 axially lined up next to one another. Short-circuiting bars 3 pass through these solid disks 1 in the axial direction, the short-circuiting bars 3 being arranged in the circumferential direction with regard to the end faces of the stack of solid disks 1. Furthermore, a short-circuiting disk 4 is provided in each case at the end faces of the stack. The short-circuiting disks 4 connect the short-circuiting bars 3 to one another and thus form a cage winding.

It has proved to be very advantageous that the solid disks 1 have a defined pressing surface 5 at their end faces and that tie rods 2 pass through the stack of solid disks 1 in the axial direction in the region of and/or close to these pressing surfaces 5. The tie rods 2 are arranged in the circumferential direction with regard to the end faces of the stack. The tie rods 2 achieve the effect that the solid disks 1 are pressed against one another at their defined pressing surfaces 5, as a result of which an especially rigid rotor assembly, in particular at high speeds, can be achieved. According to FIG. 1, the defined pressing surface 5 of the solid disk 1 is designed according to the invention essentially as an annular surface, the latter being located essentially in the marginal region and/or close to the marginal region of the end face of each solid disk 1. At the high speeds of the rotor which are required, high flexural rigidity is made possible, in particular in the region of the solid disks 1 which is especially subjected to stress by the high centrifugal forces, and this high flexural rigidity results in especially smooth concentric running of the rotor. In this case, even small axial forces in the tie rods 2 are sufficient to achieve this flexural rigidity. In addition, desired high flexural rigidity during thermal loads is achieved to the desired extent by the solid disks 1 pressing against one another at the defined pressing surfaces 5. Furthermore, the solid disks 1 can be produced in a very simple manner, for example by turning.

Figure 3:
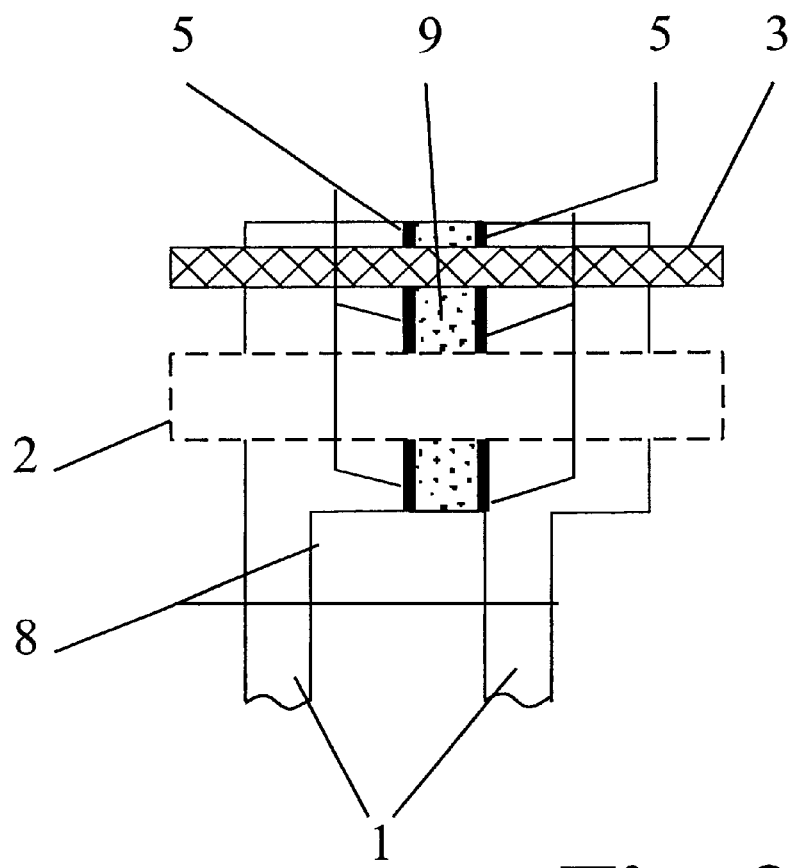
FIG. 3 shows a detail of two solid disks lying next to one another.

A detail of two solid disks 1, lying next to one another, of the rotor according to the invention is shown in FIG. 3. In this case, an insulating film 9 is provided between each two solid disks 1 and is arranged essentially in the region of the pressing surfaces 5. As a result, the solid disks 1 are advantageously insulated from one another and eddy currents which occur and the associated losses in the solid disks 1 are reduced.

According to FIG. 1, tie rods 2 likewise pass through the short-circuiting disks 4, these tie rods 2 being arranged in the circumferential direction with regard to the end faces of the short-circuiting disks 4. In this case, the tie rods 2 serve to press the short-circuiting disks 4 against the stack of solid disks 1. Furthermore, according to FIG. 1, a shaft stub 6 is in each case arranged on those end faces of the short-circuiting disks 4 which face away from the stack, and the tie rods 2 likewise pass through this shaft stub 6, the tie rods 2 being supported on the shaft stubs 6. The shaft stubs 6 are pressed against the short-circuiting disks 4 by the tie rods 2. To this end, each shaft stub 6 has a defined pressing surface 5 on the side facing the respective short-circuiting disk 4, and this pressing surface 5 is an essentially annular surface and is located essentially in the marginal region and/or close to the marginal region of the side facing the respective short-circuiting disk 4. Desired high flexural rigidity is also achieved at these pressing surfaces 5 by the tie rods 2 being supported on the shaft stubs 6 and by the shaft stubs 6 being pressed against the short-circuiting disks 4.

Figure 2:
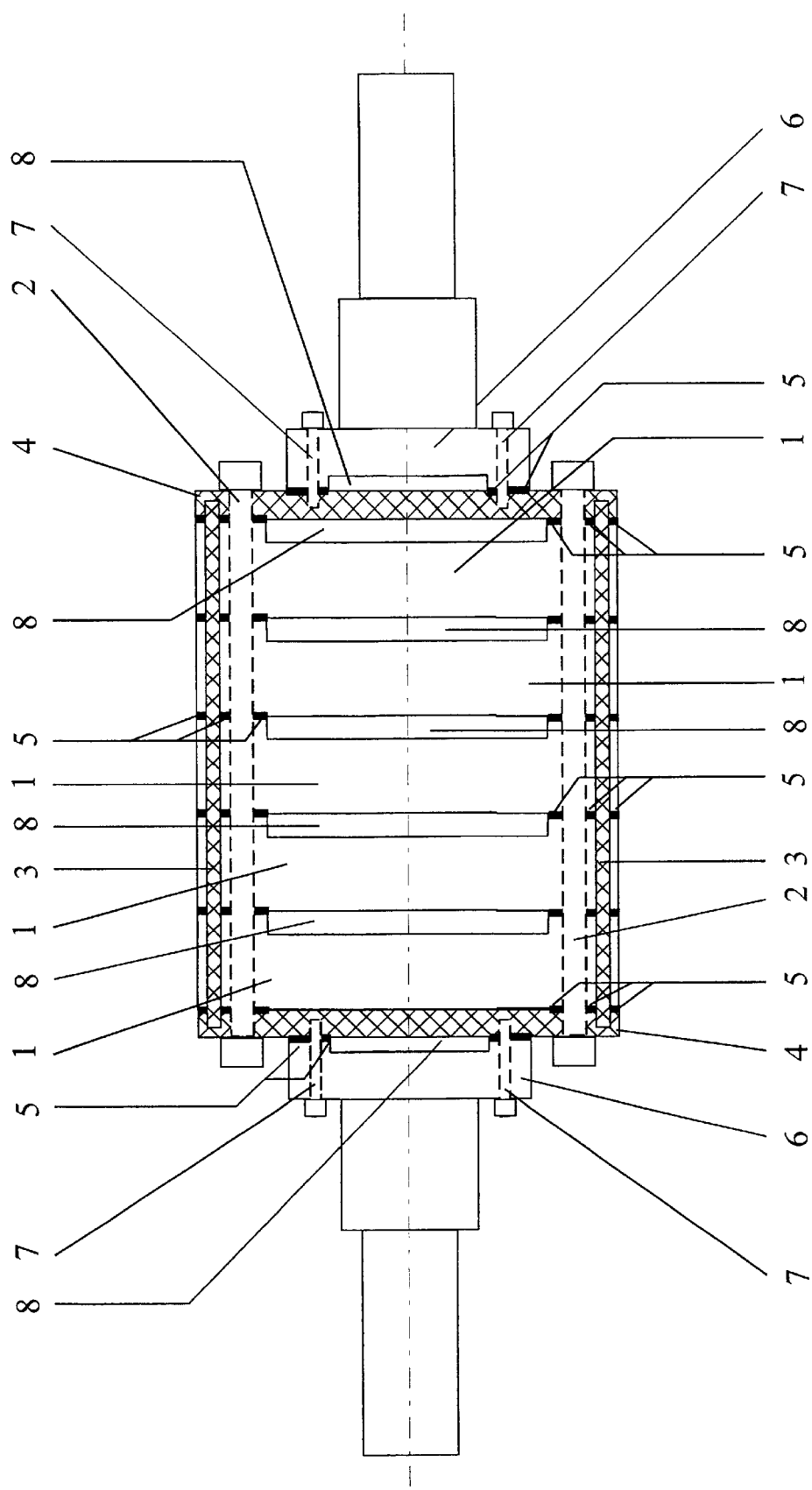
FIG. 2 shows an alternative embodiment to FIG. 1 of a rotor for a high-speed electrical machine in the sectional front view.

In an alternative embodiment according to the invention and shown in FIG. 2 of the rotor, the tie rods 2, unlike the embodiment of the rotor according to FIG. 1, are supported on the short-circuiting disks 4. The tie rods 2 pass through the short-circuiting disks 4 in the manner already described. In addition, a shaft stub 6, as already mentioned, is in each case arranged on those end faces of the short-circuiting disks 4 which face away from the stack of solid disks 1, but said shaft stub 6, unlike FIG. 1, is in each case connected to the respective short-circuiting disk via a plurality of axial bolts 7 passing through the shaft stub 6 in the axial direction. In this alternative embodiment of the rotor according to FIG. 2, as in the embodiment shown in FIG. 1, each shaft stub 6 also has a defined pressing surface 5 on the side facing the respective short-circuiting disk 4, and this pressing surface 5 is an essentially annular surface and is located essentially in the marginal region and/or close to the marginal region of the side facing the respective short-circuiting disk 4. The axial bolts 7 serve to press the shaft stubs 6 against the short-circuiting disks 4, this taking place at the defined pressing surface 5. There is a detachable connection between the shaft stubs 6 and the respective short-circuiting disks 4 by means of the axial bolts 7, so that, for example during any shaft bearing change which may arise, only this connection has to be released for the requisite maintenance work without having to remove the tie rods 2.

Figure 4:
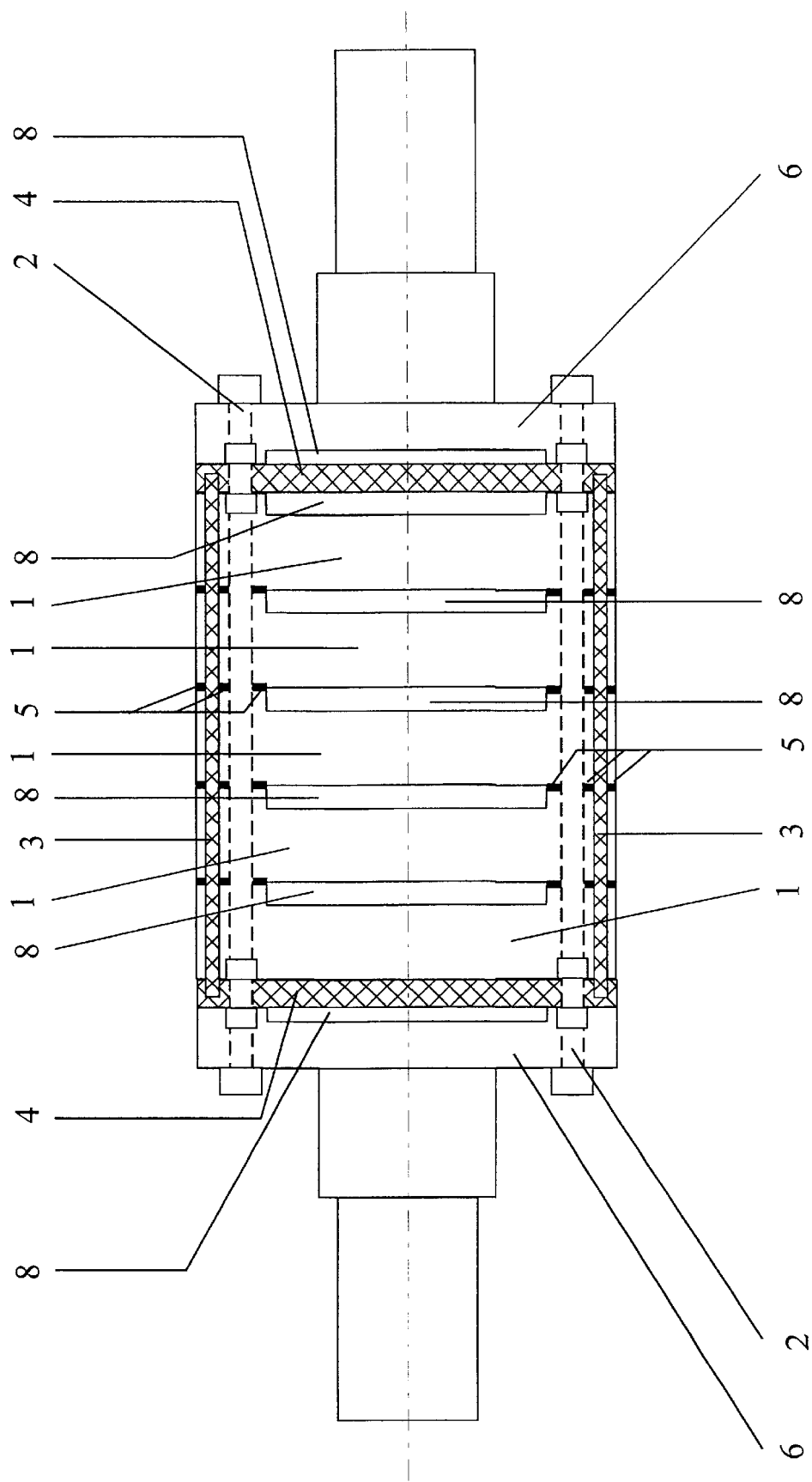
FIG. 4 shows a further alternative embodiment to FIG. 1 and FIG. 2 of a rotor for a high-speed electrical machine in the sectional front view.

In a further alternative embodiment according to the invention of the rotor according to FIG. 4, the tie rods 2, unlike the embodiment of the rotor according to FIG. 1 and FIG. 2, are supported on the end faces of the stack of solid disks 1 and thus press the latter against one another at the defined pressing surfaces 5. Furthermore, the tie rods 2 pass through the short-circuiting disks 4 in the manner already described. A shaft stub 6, as already mentioned, is in each case arranged on those end faces of the short-circuiting disks 4 which face away from the stack of solid disks 1. In this case, as in the embodiment of the rotor according to FIG. 1, the tie rods 2 pass through the shaft stubs 6, the tie rods 2 being supported on the shaft stubs 6. However, unlike the embodiment of the rotor according to FIG. 1 and FIG. 2, the shaft stubs 6 are not pressed against the short-circuiting disks 4 but are each braced by themselves. The shaft stubs 6 are therefore only mounted on and fastened to the tie rods 2. This embodiment of the rotor according to FIG. 4 specifies an extremely flexurally rigid rotor in which the short-circuiting disks 4 can advantageously expand in the axial direction, in particular during high thermal loads, independently of the remaining parts of the rotor without substantially loading the tie rods 2 with tensile forces.

Furthermore, the solid disks 1 shown in FIG. 1 to FIG. 4 have a recess 8 which is provided centrally on at least one of the end faces of each solid disk 1 and so as to adjoin the marginal region. The recess 8 is advantageously of rotationally symmetrical design. As a result, an advantageous reduction in material combined with a reduction in the weight of the solid disks 1 is achieved. In this case, the flexural rigidity of the rotor remains unaffected, since the recess 8 according to FIG. 1 to FIG. 4 only adjoins the marginal region of the solid disk 1 without the pressing surface 5 being affected.

In the preferred embodiment of the rotor according to FIG. 1 and in the alternative embodiments of the rotor according to FIG. 2 and FIG. 4, a central, rotationally symmetrical recess 8 adjoining the marginal region is also provided on the shaft stub 6 on that side of the shaft stub 6 which faces the respective short-circuiting disk 4. With this measure, weight and material of the rotor are additionally saved without suffering losses in the flexural rigidity of the rotor, since, as already mentioned, the marginal region at the respective shaft stub 6 also remains unaffected in this case. As a result, the thermal resistance, and in particular the longitudinal thermal resistance of the entire rotor, is increased and the heating of the shaft stubs 6 and their bearings is reduced.

What is claimed is:

1. A rotor for a high-speed electrical machine, comprising: a stack of several thick solid disks axially lined up next to one another, short-circuiting bars passing through the stack in the axial direction and being connected to one another at their ends, the solid disks having a defined pressing surface at their end faces, the tie rods passing through the stack in the axial direction in the region of and/or close to the pressing surfaces, the tie rods pressing the solid disks against one another at the pressing surfaces, wherein the pressing surface is located essentially in the marginal region and/or close to the marginal region.

2. The rotor as claimed in claim 1, wherein an insulating film is provided between the solid disks.

3. The rotor as claimed in claim 2, wherein the insulating film is arranged essentially in the region of the pressing surfaces.

4. The rotor as claimed in claim 1, wherein in each case a short-circuiting disk is arranged at the end faces of the stack, the short-circuiting disks connecting the short-circuiting bars to one another.

5. The rotor as claimed in claim 4, wherein the tie rods pass through the short-circuiting disks in the axial direction.

6. The rotor as claimed in claim 5, wherein the tie rods are supported on the short-circuiting disks, the tie rods pressing the short-circuiting disks against the end faces of the stack.

7. The rotor as claimed in claim 5, wherein the tie rods are supported on the end faces of the stack.

8. The rotor as claimed in claim 5, wherein in each case a shaft stub is arranged on those end faces of the short-circuiting disks which face away from the stack.

9. The rotor as claimed in claim 8, wherein tie rods pass through the shaft stubs in the axial direction, the tie rods being supported on the shaft stubs.

10. The rotor as claimed in claim 9, wherein the shaft stubs are mounted on and fastened to the tie rods.

11. The rotor as claimed in claim 8, wherein each shaft stub is connected to the respective short-circuiting disk via a plurality of axial bolts passing through the shaft stub in the axial direction, the axial bolts pressing the shaft stubs against the short-circuiting disks.

12. The rotor as claimed in claim 9, wherein the tie rods press the shaft stubs against the short-circuiting disks.

13. The rotor as claimed in claim 11, wherein each shaft stub has a defined pressing surface on the side facing the respective short-circuiting disk.

14. The rotor as claimed in claim 13, wherein the defined pressing surface is essentially an annular surface.

15. The rotor as claimed in claim 1, wherein a central recess adjoining the marginal region is provided on at least one end face of each solid disk.

16. The rotor as claimed in claim 8, wherein a side of the shaft stub which faces the respective short-circuiting disk has a central recess adjoining the marginal region.

17. The rotor as claimed in claim 15, wherein the recess is rotationally symmetrical.

* * * * *